United States Patent [19]

Yamamoto et al.

[11] Patent Number: 5,216,437
[45] Date of Patent: Jun. 1, 1993

[54] INK, AND RECORDING METHOD MAKING USE OF SAME

[75] Inventors: Takao Yamamoto, Isehara; Tsuyoshi Eida, Yokohama; Katsuhiro Shirota; Megumi Saito, both of Kawasaki, all of Japan

[73] Assignee: Canon Kabushiki Kaisha, Tokyo, Japan

[21] Appl. No.: 831,674

[22] Filed: Feb. 5, 1992

Related U.S. Application Data

[60] Division of Ser. No. 752,204, Aug. 21, 1991, which is a continuation-in-part of Ser. No. 472,963, Jan. 31, 1990, abandoned.

[30] Foreign Application Priority Data

Feb. 2, 1989 [JP] Japan .................................. 1-22487
Jan. 1, 1990 [JP] Japan .................................... 2-938

[51] Int. Cl.$^5$ .............................................. G01D 9/00
[52] U.S. Cl. ................................. 346/1.1; 346/140 R; 106/22 K
[58] Field of Search ........................... 346/1.1, 140 R

[56] References Cited

U.S. PATENT DOCUMENTS 4,620,876 11/1986 Fujii et al. ............................... 106/22

FOREIGN PATENT DOCUMENTS 0218143 4/1987 European Pat. Off.
3330379 2/1984 Fed. Rep. of Germany.

Primary Examiner—William R. Dixon, Jr.
Assistant Examiner—Margaret V. Einsmann
Attorney, Agent, or Firm—Fitzpatrick, Cella, Harper & Scinto

[57] ABSTRACT

An ink that includes a liquid medium and a dye represented by the following Formula (I):

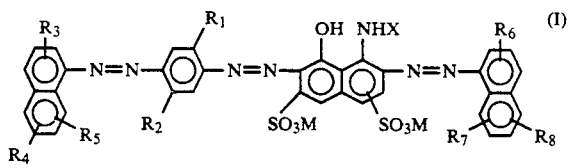

wherein M represents a cation selected from an alkali metal, ammonium, and an organic ammonium; $R_1$ and $R_2$ independently represent a group selected from a hydrogen atom, a methyl group, a methoxy group, an ethoxy group, and an acetylamino group; $R_3$, $R_4$, $R_5$, $R_6$, $R_7$ and $R_8$ independently represent a group selected from a hydrogen atom, a hydroxyl group, a sulfonic acid group, a methoxy group, and an ethoxy group; X represents a hydrogen atom, an acetyl group, a benzoyl group, $-SO_2C_6H_5$, $-SO_2C_6H_4CH_3$, or

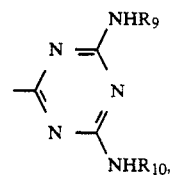

where $R_9$ and $R_{10}$ independently represent a hydrogen atom, or $-C_2H_4OH$; and the sulfonic acid group is present as a salt of the same cation as that represented by M.

21 Claims, 3 Drawing Sheets

INK, AND RECORDING METHOD MAKING USE OF SAME

This application is a division of continuation-in-part application Ser. No. 07/752,204 filed Aug. 21, 1991, which is a continuation-in-part of application Ser. No. 07/472,963, filed Jan. 31, 1990, now abandoned.

BACKGROUND OF THE INVENTION

1. Field of the Invention

The present invention relates to an ink, and a recording method making use of it. More particularly, it relates to a water-based ink capable of providing an image having improved indoor color change resistance, and a recording method, in particular, ink-jet recording method, making use of it.

2. Related Background Art

Water-based inks comprising a water-soluble dye dissolved in a water-based medium have been hitherto as inks used in fountain pens and felt pens, and inks used for ink-jet recording. In these water-based inks, water-soluble organic solvents are commonly added so that pen points or ink ejection nozzles can be prevented from being clogged with ink.

It is required for these conventional inks, for example, to provide an image with a sufficient density, not to cause any clogging at pen points or nozzles, to have good drying properties on recording mediums, to cause less feathering, to have excellent shelf stability, and, particularly in ink-jet recording systems utilizing heat energy, to have excellent thermal resistance. It is also required for the image formed to have satisfactory lightfastness and waterfastness.

For example, for the most important inks, which are used in both monochromatic and full-color images, C.I. Food Black 2 has been mainly used taking account of the above required performances (see Japanese Patent Application Laid-Open No. 59-93766 and No. 59-93768).

Among the various required performances, what is particularly important is the fastness of the images formed.

In regard to the fastness of images, hitherto mainly questioned is the color fading due to direct sunlight or various illumination lights. Such a problem of color-fading has been attempted to be settled by the selection of dyes having superior lightfastness.

Recently, however, a problem of color changes of images has become significant in addition to the above color fading. Namely, images formed by conventional inks have not only the problem of color fading but also the problem of color changes. These give very significant influences on black inks used in a largest quantity. In particular, in the instance of full-color images, the color changes result in a great lowering of image quality, bringing about an significant problem for the formation of images.

This problem of color changes also occurs indoors without exposure to direct sunlight. The color changes are also accelerated depending on the types of recording mediums on which images are formed, and this problem of color changes has been unavoidable in respect of the C.I. Food black 2 that has been hitherto widely used.

So-called coated papers comprises a substrate such as paper and formed thereon an ink-receiving layer containing a pigment and a binder, for the purpose of improving the color-forming performance of ink and the image quality such as sharpness and resolution. In such an instance, the color changes may seriously occur even with use of inks that may cause less problem of color change on plain papers. This problem has not been resolved by the mere selection of dyes having superior lightfastness.

SUMMARY OF THE INVENTION

Accordingly, an object of the present invention is to provide an ink that can satisfy the performances commonly required as mentioned above and also may not cause color changes even on the coated papers, and a recording method making use of this ink.

The above object can be achieved by the present invention as described below.

The present invention provides an ink, and a recording method making use of the ink, containing at least a dye and a liquid medium, wherein the dye is represented by the following Formula (I):

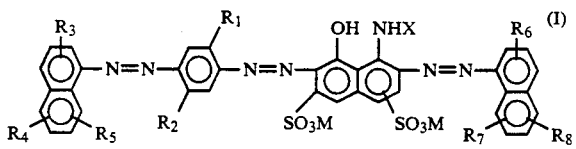

wherein M represents a cation selected from an alkali metal, ammonium, and an organic ammonium; $R_1$ and $R_2$ independently represent a group selected from a hydrogen atom, a methyl group, a methoxy group, an ethoxy group, and an acetylamino group; $R_3$, $R_4$, $R_5$, $R_6$, $R_7$ and $R_8$ independently represent a group selected from a hydrogen atom, a hydroxyl group, a sulfonic acid group, a methoxy group, and an ethoxy group; X represents a hydrogen atom, an acetyl group, a benzoyl group, $-SO_2C_6H_5$, $-SO_2C_6H_4CH_3$, or

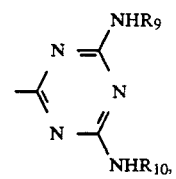

where $R_9$ and $R_{10}$ independently represent a hydrogen atom, or $-C_2H_4OH$; and the sulfonic acid group is present as a salt of the same cation as that represented by M.

DETAILED DESCRIPTION OF THE PREFERRED EMBODIMENTS

Figure 1A:
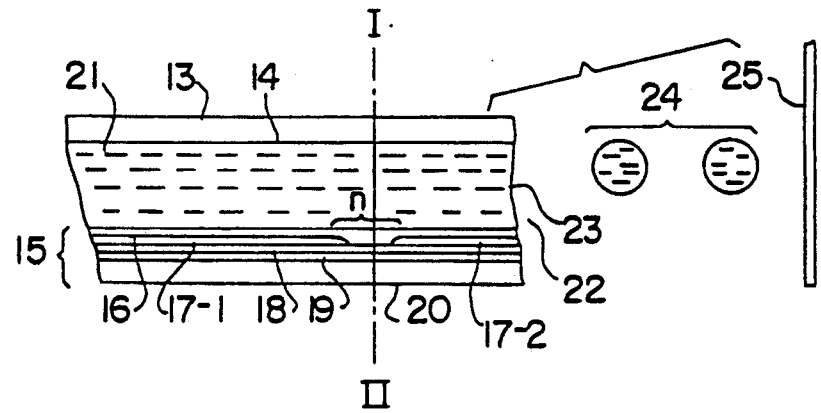
FIGS. 1(a) and 1(b) are respectively a longitudinal sectional view and a cross-sectional view of the head part of an ink jet recording device.

Use of the dye of the above Formula (I) as a dye for ink makes it possible to provide an ink capable of giving an image that may cause less color changes on the coated papers.

In the recording method of the present invention, use of the above ink makes it possible to provide an image that may cause less color changes on the coated papers.

The present invention will be described below in greater detail by giving preferred embodiments.

Black dyes used in the present invention are represented by the above Formula (I), where the substituents $R_1$ to $R_{10}$, M and X are all as defined above. More preferably used are dyes wherein X is a substituent other than the hydrogen atom. In these dyes water-soluble groups such as a sulfonic acid group therein are present as sodium salts. In the present invention, however, they are not limited to the sodium salts, and the same effect can be obtained also when the counter ions thereof are potassium, lithium, ammonia, phosphonium, organic amine such as alcohol amine, or the like. Thus, the dyes containing any of these other counter ions are also included in the present invention.

Examples of the dye represented by the above Formula (I) include the following dyes, but are by no means limited to these:

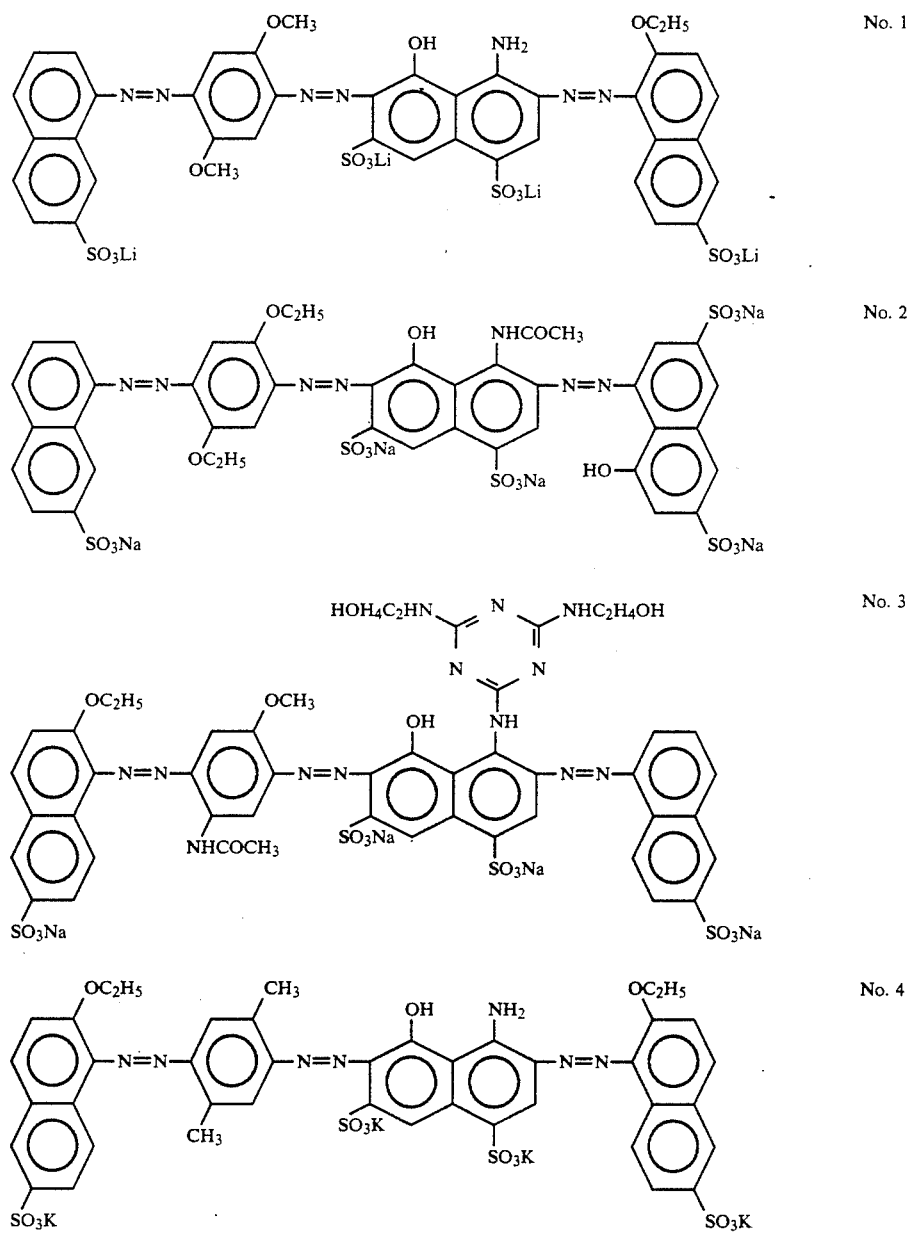

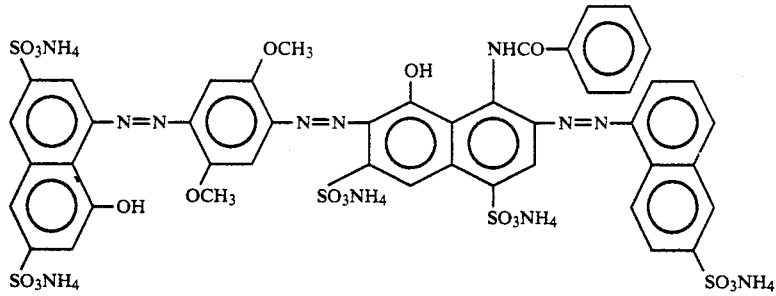
No. 5
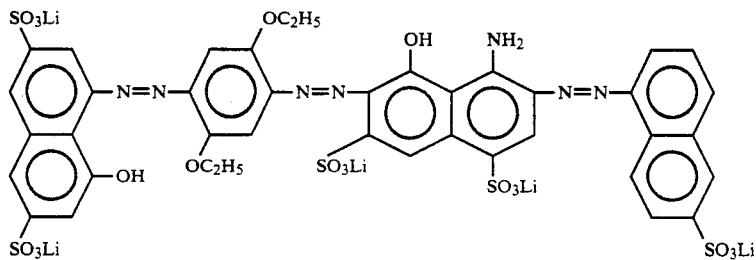
No. 6
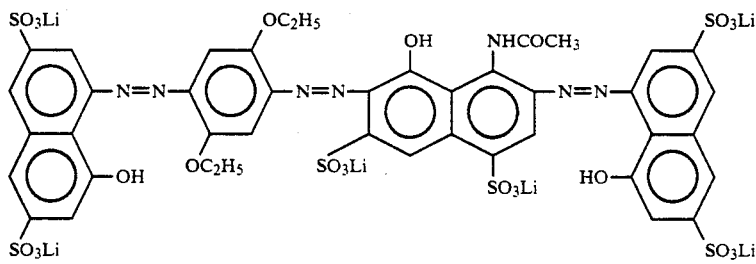
No. 7
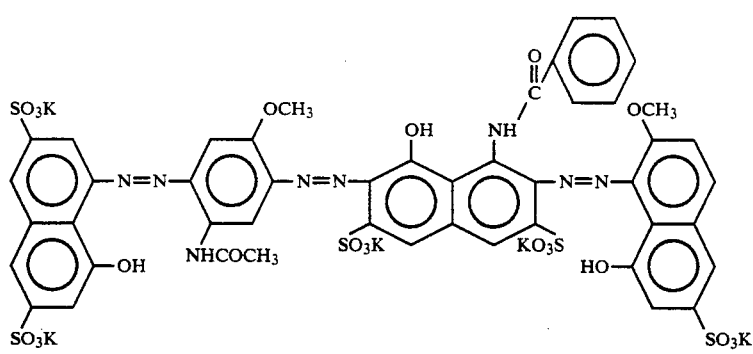
No. 8
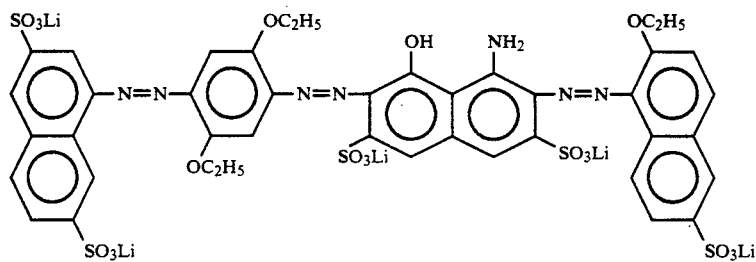
No. 9

-continued
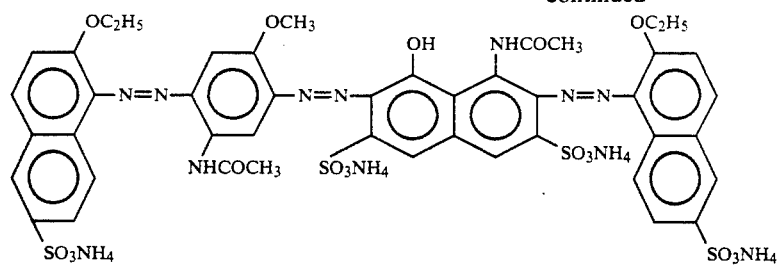 No. 10
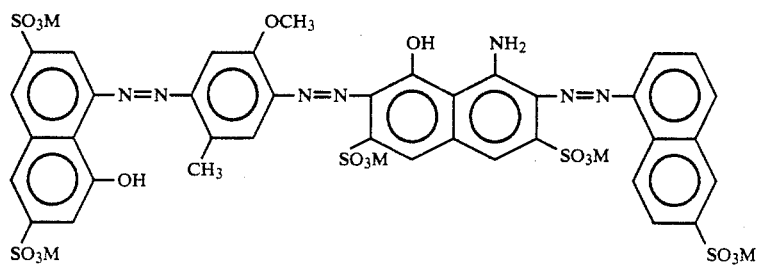 No. 11
(M = NH₃C₂H₄OH)
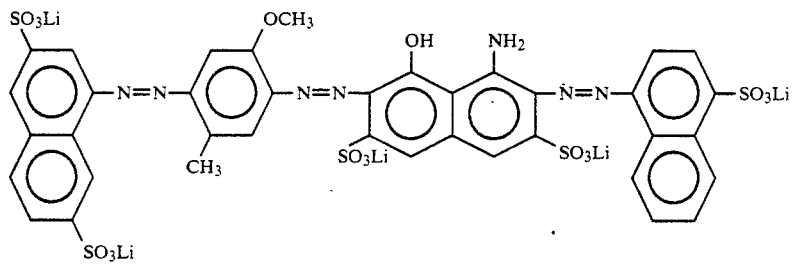 No. 12
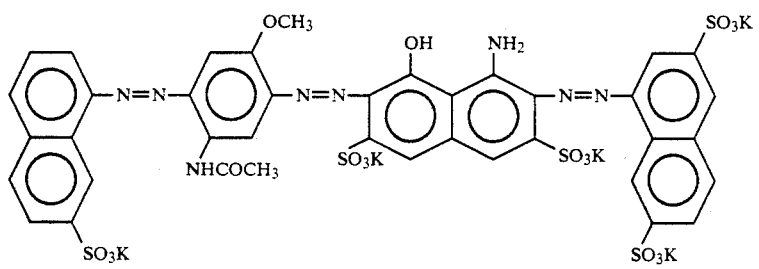 No. 13
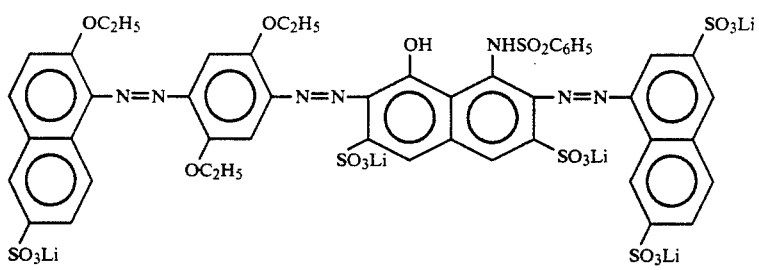 No. 14
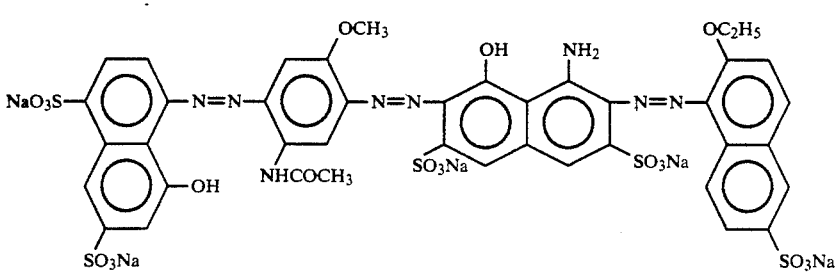 No. 15

-continued

No. 16
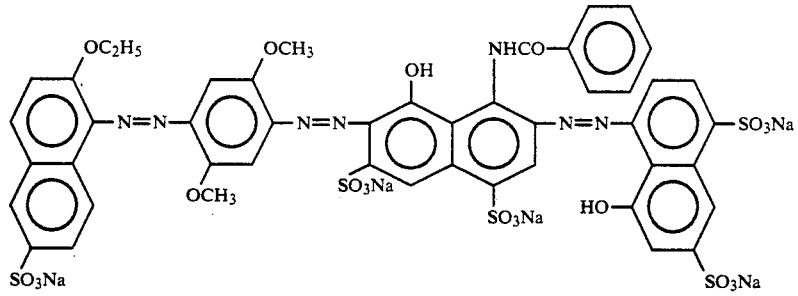

No. 17
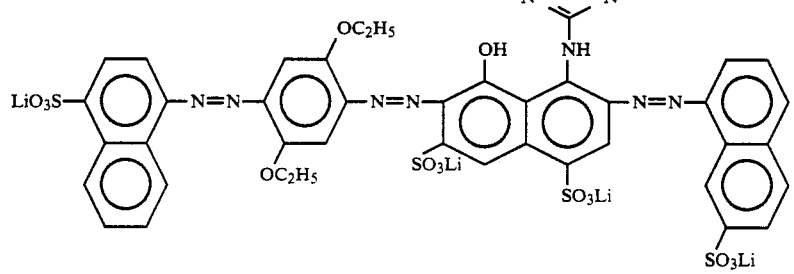

No. 18
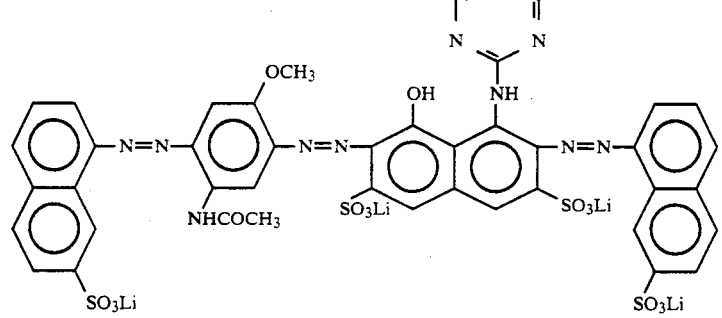

No. 19
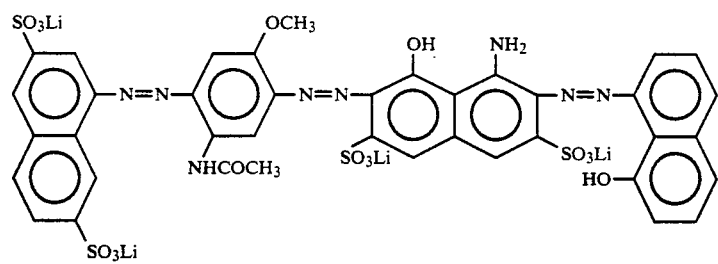

No. 20
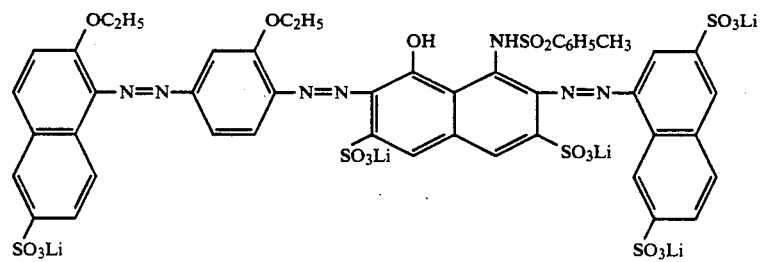

Of these compounds, preferred are those in which $R_1$ and $R_2$ are selected from methoxy, ethoxy and acetylamino; $R_3$ and $R_6$ are selected from hydrogen, methoxy and ethoxy; $R_4$, $R_5$, $R_7$ and $R_8$ are selected from hydrogen, hydroxyl and sulfonic acid group, provided that one of $R_4$ and $R_5$ and one of $R_7$ and $R_8$ are selected from hydroxyl and sulfonic acid group.

The dyes as exemplified in the above can be prepared following the syntheses of azo dyes known in the art.

Examples of the syntheses of the above No. 1 and No. 11 dyes will be described below.

Dye No. 1

1-Amino-2-ethoxynaphthalene-6-sulfonic acid is diazotized according to a conventional method, and then coupled with K-acid at pH 4 to 5. 1-Naphthylamine-7-sulfonic acid is diazotized according to a conventional method, then coupled with dimethoxyaniline, and further diazotized using sodium nitrite. The resulting diazotized solution is added in the above reaction mixture, followed by stirring for 4 hours at a pH of 8 to 9 and at a temperature of 5° to 10° C. The operation of adding lithium chloride to effect salting out and filtration of the dye is repeated several times so that impurities are removed and at the same time the counter ions of the dye are converted to lithium ions. Desalting purification is carried out using an ultrafiltration machine (manufactured by Saltrius Co.). The above No. 1 dye is thus obtained.

Dye No. 11

1-Naphthylamine-6-sulfonic acid is diazotized according to a conventional method, and then coupled with K-acid at pH 4 to 5. H-acid is separately diazotized according to a conventional method, and then coupled with 5-methylo-anisidine, and the product is further diazotized. The resulting diazotized solution is added in the above reaction mixture, followed by stirring for 3 hours at a pH of 8 to 9 under ice cooling. Sodium chloride is added to effect salting out and filtration of the dye, followed by desalting purification by the use of an ultrafiltration machine (manufactured by Saltrius Co.). Using a strongly acidic ion-exchange resin, the sulfonic acid group in the molecule of the dye is converted to a free acid type, followed by neutralization using monoethanolamine. The above No. 11 dye is thus obtained.

There are no particular limitations on the amount of the dye to be used in the ink of the present invention. In general, however, it may be an amount that holds from 0.1 to 15% by weight, preferably from 0.3 to 10% by weight, and more preferably from 0.5 to 6% by weight, based on the total weight of the ink.

The aqueous medium preferably used in the ink of the present invention is water, or a mixed solvent of water with water-soluble organic solvent. Particularly preferably used is the mixed solvent of water with a water-soluble organic solvent, containing as the water-soluble organic solvent a polyhydric alcohol having the effect of preventing the ink from drying. As the water, it is preferred not to use commonly available water containing various ions, but to use deionized water.

The water-soluble organic solvent used by mixture with the water includes, for example, alkyl alcohols having 1 to 5 carbon atoms, such as methyl alcohol, ethyl alcohol, n-propyl alcohol, isopropyl alcohol, n-butyl alcohol, sec-butyl alcohol, tertbutyl alcohol, isobutyl alcohol, and n-pentanol; amides such as dimethylformamide and dimethylacetamide; ketones or ketoalcohols such as acetone and diacetone; ethers such as tetrahydrofuran and dioxane; polyalkylene glycols such as polyethylene glycol and polypropylene glycol; alkylene glycols comprising an alkylene group having 2 to 6 carbon atoms, such as ethylene glycol, propylene glycol, butylene glycol, triethylene glycol, 1,2,6-hexanetriol, thiodiglycol, hexylene glycol, and diethylene glycol; glycerol; lower alkyl ethers of polyhydric alcohols, such as ethylene glycol monomethyl or monoethyl ether, diethylene glycol monomethyl or monoethyl ether, and triethylene glycol monomethyl or monoethyl ether; lower dialkyl ethers of polyhydric alcohols, such as triethylene glycol dimethyl or diethyl ether and tetraethylene glycol dimethyl or diethyl ether; sulfolane, N-methyl-2-pyrrolidone, and 1,3-dimethyl-2-imidazolidinone.

Suitable solvents are selected from the organic solvents as described above and put into use. From the view point of preventing the clogging with ink, particularly preferred is glycerol or a polyethylene oxide with a degree of polymerization of 2 to 6. Taking account of image density and ejection stability, preferred are nitrogen-containing cyclic compounds such as N-methyl-2-pyrrolidone and 1,3-dimethyl-2-imidazolidinone or mono ether compounds of polyalkylene oxides such as diethylene glycol monomethyl(ethyl) ether and triethylene glycol monomethyl(ethyl) ether. Further taking account of frequency response, it is preferred to use lower alcohols such as ethyl alcohol, n-propyl alcohol and iso-propyl alcohol or surface active agents. Hence, the solvent composition preferred in the present invention many contain all the components as described above in addition to the water.

The above water-soluble organic solvent may be contained in the ink in an amount of generally from 2 to 80% by weight, preferably from 3 to 70% by weight, and more preferably from 4 to 60% by weight, based on the total weight of the ink.

The water to be used may be in a proportion such that it holds not less than 35% by weight, and preferably not less than 45% by weight, of the whole ink. An excessively small amount of water may result in a large quantity of a low-volatile organic solvent remaining in the image formed, undesirably causing the problems of migration of dyes, feathering of images, and so forth.

In addition to the above components, the ink of the present invention may also optionally contain pH adjustors, viscosity modifiers, surface tension modifiers, and so forth. The pH adjustors used in the above ink include, for example, all sorts of organic amines such as diethanolamine and triethanolamine, inorganic alkali agents such as alkali metal oxides as exemplified by sodium hydroxide, lithium hydroxide and potassium hydroxide, organic acid salts such as lithium acetate, organic acids, and mineral acids.

The ink of the present invention, as described above, may preferably have physical properties, at 25° C., of a viscosity of from 1 to 20 cP, and preferably from 1 to 15 cP; a surface tension of not less than 30 dyne/cm, and preferably not less than 40 dyne/cm; and a pH of approximately from 4 to 10.

The recording method of the present invention is characterized by using the ink described above, and there are no particular limitations on recording systems and recording mediums. In particular, however, effective are methods in which an ink-jet system is used as the recording system and a coated paper is used as the recording medium.

The ink-jet system may include any conventionally known systems, without any particular limitations. In the present invention, however, the system as disclosed in Japanese Patent Application Laid-Open No. 54-59936 is particularly useful, which is a system in which heat energy is applied to an ink to cause therein an abrupt volume change and the ink is ejected from a nozzle by the force of action attributable to this change in state.

Namely, in this system, conventional inks have tended to cause deposition of foreign matters on a heating head and hence cause the problem of no ejection of ink. However, the ink of the present invention, which does not cause such deposition of foreign matters, is feasible for stable recording.

As the recording medium used in the present invention, any recording mediums can be used such as commonly available plain papers such as wood free papers, coated papers, and plastic films for OHP. A remarkable effect can be exhibited particularly when the coated papers are used.

The coated papers refer to those which are constituted of a substrate such as wood free paper and an ink-receiving layer provided on the surface of the substrate, where the ink-receiving layer comprises a pigment and a binder to aim at improvements in the color-forming properties attributable to ink, sharpness, and dot shapes.

In the case of these coated papers, those which employ as the pigment a fine pigment such as synthetic silica having a BET specific surface area of from 35 to 650 m$^2$/g can provide images having excellent color-forming properties and sharpness. When conventional inks are used, however, the image formed may seriously cause the problem of color changes with lapse of time though its theoretical reasons are unknown, and great problems are also caused in not only black monochromatic images but also full-color images. Similar problems are also caused in recording mediums constituted of, like these coated papers, a paper substrate and a thin layer provided thereon, the thin layer comprising a pigment and a binder, where fibers of the paper that constitutes the substrate are present in this layer in a mixed state.

It was found that use of the ink of the present invention does not cause the problems of color changes as discussed above even when monochromatic images or full-color images are formed on the coated papers as mentioned above. Thus, the method according to the present invention can provide recorded images that may not bring about any indoor color change for a long period of time, when using not only the coated papers employing the pigment having a BET specific surface area of from 35 to 650 m$^2$/g, but also coated papers employing a pigment having a BET specific surface area smaller than that, and also plain papers and any other recording mediums.

The ink-jet system and the various recording mediums are known in the art, or proposed in variety by the present applicants and others. These recording systems and the recording mediums can all be used in the present invention as they are.

The ink of the present invention is preferably used in the ink jet recording method in which ink droplets are discharged by employing thermal energy. However, the recording solution can also be used for general writing utensils.

An example of the recording apparatus which is preferable for recording by using the ink of the present invention is an apparatus in which ink droplets are produced by applying heat energy to the ink in the chamber of a recording head in correspondence with a recording signal.

Figure 1B:
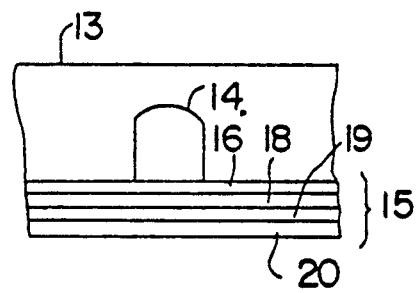
Figure 2:
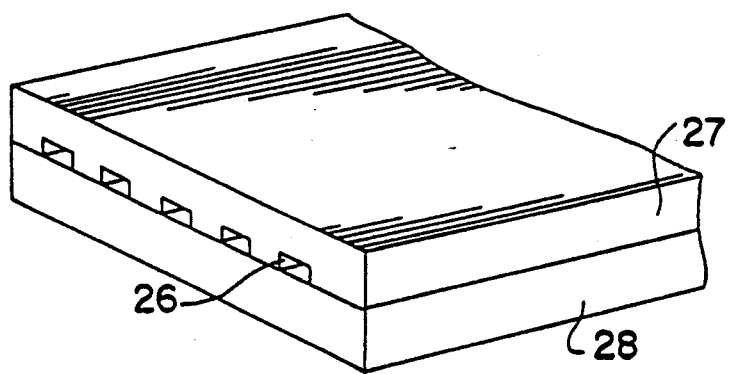
FIG. 2 is a perspective view of the appearance of a multiple head which comprises the head shown in FIG. 1.

FIGS. 1(a), 1(b) and 2 show examples of the structure of a head, which is a principal part of an ink jet recording apparatus.

In the drawings, a head 13 is formed by bonding a glass, ceramic or plastic plate, which has a groove 14 for allowing ink to pass therethrough, and a heating head 15 used for heat-sensitive recording. Although a thin film head is shown in the drawings, the head is not limited to such an embodiment. The heating head 15 comprises a protective film 16 made of silicon oxide or the like, aluminum electrodes 17-1, 17-2, a heating resistor layer 18 made of nichrome or the like, a heat-accumulating layer 19 and a substrate 20 made of aluminum or the like and having good heat radiation properties.

Ink 21 reaches a discharging orifice (micropore) 22 and forms a meniscus 23 at pressure P.

When an electrical signal is applied to the electrodes 17-1, 17-2, a region off the heating head 15, which is denoted by n, rapidly generates heat so as to generate air bubbles in the ink 21 which contacts with the region. The meniscus 23 is projected by the pressure generated, and the ink 21 is discharged as a jet of ink droplets 24 from the orifice 22. The droplets 24 are propelled toward a recording material 25. FIG. 2 shows a multiple head comprising a plurality of the heads shown in FIG. 1(a) which are arranged in parallel. The multi-head is formed by bonding a glass plate 27 having a plurality of grooves 26 and a heating head 28, which is the same as that shown in FIG. 1(a).

FIG. 1(a) is a sectional view taken along the ink flow channel of the ink, and FIG. 1(b) is a sectional view taken along the line I-II in FIG. 1(a).

Figure 3:
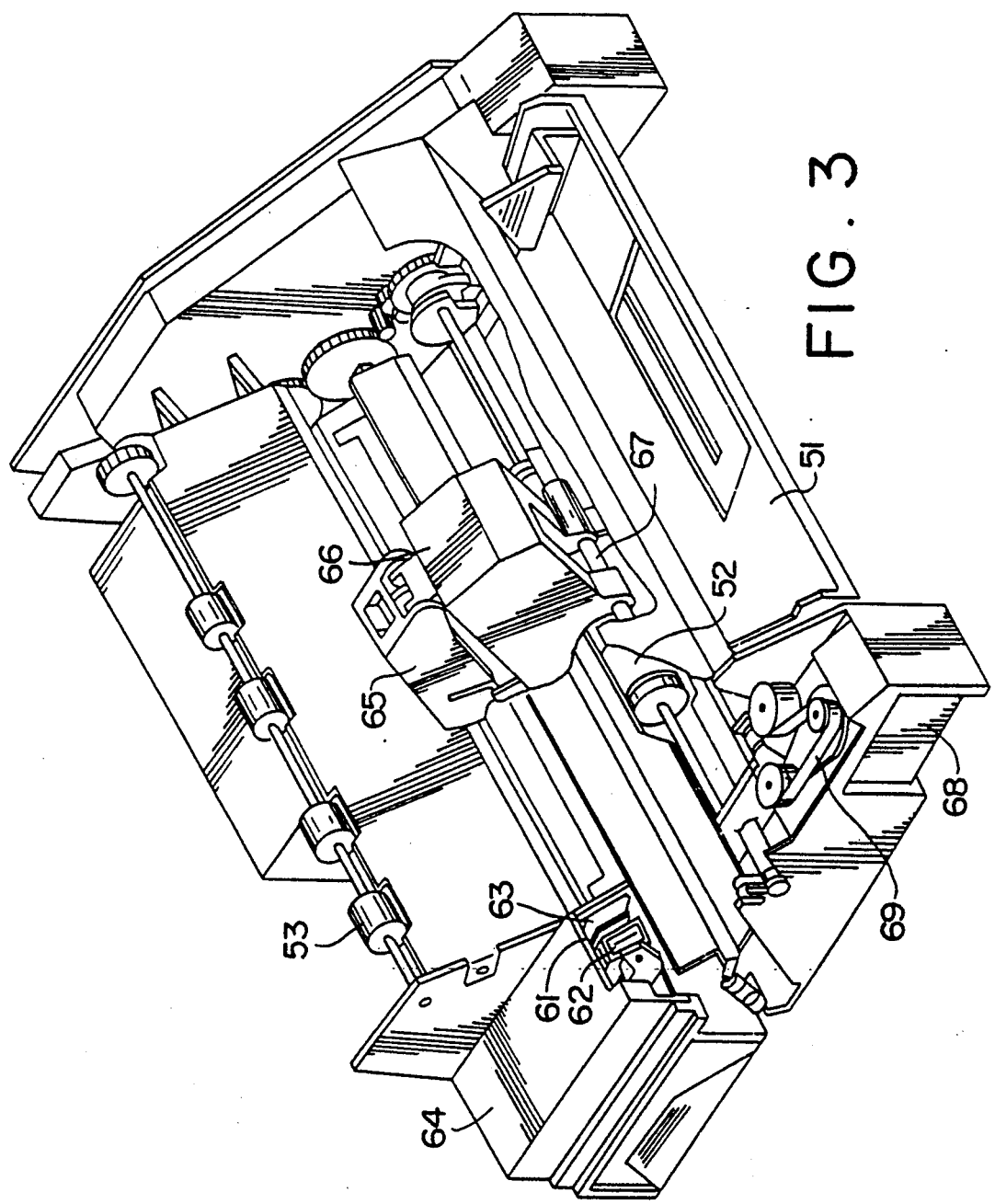
FIG. 3 is a perspective view of an example of an ink jet recording apparatus.

FIG. 3 shows an example of an ink jet recording apparatus in which the head shown in FIG. 1 is incorporated.

In FIG. 3, reference numeral 61 denotes a blade serving as a wiping member in the form of a cantilever in which one end is a fixed end held by a blade holding member. The blade 61 is disposed at a position adjacent to a region of recording by a recording head. In this example, the blade 61 is held in a position in which it projects in the path of the movement of the recording head. Reference numeral 62 denotes a cap which is disposed at a home position adjacent to the blade 61 and which is moved in the direction vertical to the moving direction of the recording head so as to contact with the orifice surface for the purpose of capping. Reference numeral 63 denotes an ink absorber which is disposed at a position adjacent to the blade 61 and which is held in a position in which it projects in the path of the movement of the recording head in the same way as the blade 61. The blade 61, the cap 62 and the absorber 63 form a discharging recovery part 64. Moisture and dust on the ink orifice surface are removed by the blade 61 and the absorber 63.

Reference numeral 65 denotes the ink jet device which has a means for generating discharging energy so as to record an image by discharging the ink to the recording material opposite to the orifice surface having orifices. Reference numeral 66 denotes a carriage for moving the ink jet device 65 which is loaded thereon. The carriage 66 is slidably engaged with a guide shaft 67 and is partially connected (not shown) to a belt 69 which is driven by a motor 68. This permits the carriage 66 to move along the guide shaft 67 and move in the region of recording by the ink jet device 65 and the region adjacent thereto.

Reference numeral 51 denotes a sheet feeding part, and reference numeral 52 denotes a sheet feeding roller which is driven by a motor (not shown). This arrangement allows the recording paper to be fed to a position opposite to the orifice surface of the recording head and to be delivered to a take-off part having a take-off roller 53 during the progress of recording.

In the aforementioned arrangement, when the ink jet device 65 is returned to the home position at the end of recording, the cap 62 is retracted from the path of the movement of the ink jet device 65, while the blade 61 is projected in the path of the movement. As a result, the orifice surface of the ink jet device 65 is wiped by the blade 61. When the cap 62 contacts with the orifice surface of the recording head 65 so as to cap it, the cap 62 is moved so as to project in the path of the movement of the ink jet device 65.

When the ink jet device 65 is moved from the home position to the recording start position, the cap 62 and the blade 61 are at the same positions as the above-described positions in wiping. As a result, the orifice surface of the ink jet device 65 is wiped even during the movement of the ink jet device 65.

The recording head 65 is moved to the home position adjacent to the recording region not only at the end of recording and during the recovery of discharging (the operation of sucking an ink from an orifice in order to recover the normal discharge of an ink from an orifice), but also at predetermined intervals when it is moved in the recording region for the purpose of recording. This movement causes the above-described wiping.

Figure 4:
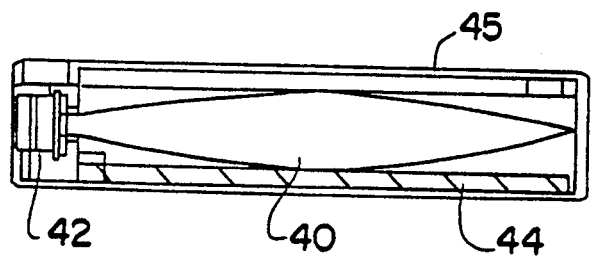
FIG. 4 is a longitudinal sectional view of an ink cartridge.

FIG. 4 is a drawing which shows an example of an ink cartridge 45 for containing the ink to be supplied to the head through an ink supply tube. In the drawing, reference numeral 40 denotes an ink bag for containing the ink to be supplied which has a rubber stopper 42 at its one end. When a needle (not shown) is inserted into the stopper 42, the ink contained in the ink bag 40 can be supplied to the ink jet device 65. Reference numeral 44 denotes an ink absorber for absorbing waste ink. As the ink bag in the present invention, there may preferably be used ones of which the surface coming into contact with the ink is formed from polyolefins, in particular polyethylene.

The ink jet recording apparatus used in the present invention is not limited to an apparatus in which a device and an ink cartridge are separately disposed, as described above. The ink jet device shown in FIG. 5 in which a device and an ink cartridge are integrated can be preferably used in the present invention.

Figure 5:
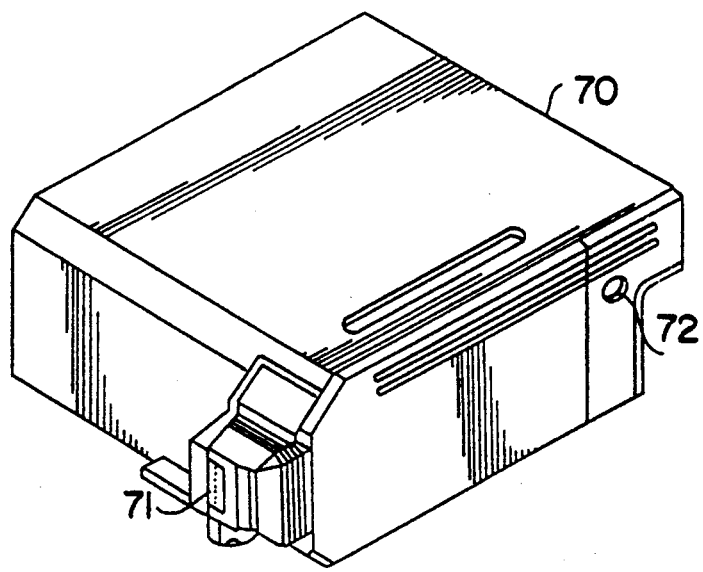
FIG. 5 is a perspective view of an ink jet device.

In FIG. 5, reference numeral 70 denotes an ink jet device which contains an ink storing member impregnated with ink. The ink in the ink storing member is discharged as ink droplets from a head part 71 having a plurality of orifices. Further, as the ink storing member, there may be used an ink absorber or an ink bag. The head is the same as those referred to in FIGS. 1 and 2.

Reference numeral 72 denotes a communicating hole for allowing the inside of the device 70 to communicate with the atmosphere. As a material for the ink absorber in the present invention, there may preferably be used polyurethanes.

The ink jet device 70 is used in place of the ink jet device 65 shown in FIG. 3 and is detachably provided on the carriage 66.

EXAMPLES

The present invention will be described below in detail by giving Examples and Comparative Examples. In the following, "part(s)" is by weight unless particularly mentioned.

EXAMPLES 1 TO 9

Components as shown below were mixed, thoroughly stirred and dissolved, followed by filtration using Fluoropore Filter (trademark; available from Sumitomo Electric Industries, Ltd.) with a pore size of 0.22 μm, to prepare inks of the present invention.

| Example 1 | |
| --- | --- |
| Exemplary Dye No. 1 | 2 parts |
| Diethylene glycol | 20 parts |
| N-methyl-2-pyrrolidone | 10 parts |
| Ion-exchanged water | 68 parts |
| Example 2 | |
| Exemplary Dye No. 2 | 2 parts |
| Diethylene glycol | 25 parts |
| Ion-exchanged water | 73 parts |
| Example 3 | |
| Exemplary Dye No. 3 | 3 parts |
| Diethylene glycol | 15 parts |
| Ethanol | 5 parts |
| Ion-exchanged water | 77 parts |
| Example 4 | |
| Exemplary Dye No. 4 | 3 parts |
| Glycerol | 10 parts |
| N-methyl-2-pyrrolidone | 10 parts |
| Ion-exchanged water | 77 parts |
| Example 5 | |
| Exemplary Dye No. 8 | 2 parts |
| Diethylene glycol | 15 parts |
| N-methyl-2-pyrrolidone | 5 parts |
| Ion-exchanged water | 78 parts |
| Example 6 | |
| Exemplary Dye No. 9 | 3.5 parts |
| Ethylene glycol | 25 parts |
| Ethanol | 5 parts |
| Ion-exchanged water | 66.5 parts |
| Example 7 | |
| Exemplary Dye No. 13 | 2 parts |
| Diethylene glycol | 10 parts |
| 1,3-Dimethyl-2-imidazolidinone | 5 parts |
| Ethanol | 5 parts |
| Ion-exchanged water | 78 parts |
| Example 8 | |
| Exemplary Dye No. 16 | 3 parts |
| Triethylene glycol | 10 parts |
| Glycerol | 5 parts |
| Ethanol | 3 parts |
| Ion-exchanged water | 79 parts |
| Example 9 | |
| Exemplary Dye No. 17 | 2.5 parts |
| Tetraethylene glycol | 2 parts |
| Glycerol | 5 parts |
| 1,3-Dimethyl-2-imidazolidinone | 5 parts |
| Ethanol | 3 parts |
| Ion-exchanged water | 82.5 parts |

COMPARATIVE EXAMPLES 1 TO 4

Inks of Comparative Examples were prepared in the same manner as in Examples.

COMPARATIVE EXAMPLE 1

An ink with entirely the same composition as Example 1, except that the dye in Example 1 was replaced with C.I. Food Black 2 represented by the formula:

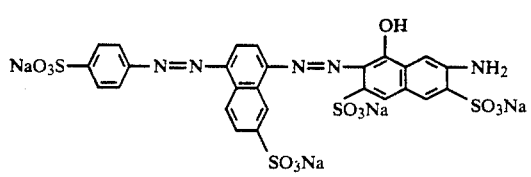

COMPARATIVE EXAMPLE 2

An ink with entirely the same composition as Example 3, except that the dye in Example 3 was replaced with C.I. Direct Black 62.

COMPARATIVE EXAMPLE 3

An ink with entirely the same composition as Example 6, except that the dye in Example 6 was replaced with C.I. Direct Black 118.

COMPARATIVE EXAMPLE 4

An ink with entirely the same composition as Example 8, except that the dye in Example 8 was replaced with C.I. Acid Black 60 which is a chromium complex of the compound represented by the formula:

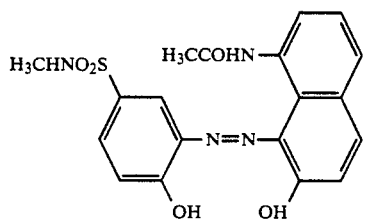

USE EXAMPLES

The respective inks of Examples 1 to 9 and Comparative Examples 1 to 4 were set on an ink-jet printer BJ-80A (a manufacture of Canon Inc.; nozzle size, 50×40 μm; nozzle number, 24) that utilizes a heating element as an ink ejection energy source, and printing was carried out on the following recording mediums A to C, under which evaluation was made on the clogging observed when the printing was stopped for a while and then again started, on the performance of recovery from the clogging observed when the printing was stopped for a long term and then again started, and on the color change resistance. Results obtained are shown in Tables 1 and 2.

Recording medium A: Designated paper for Color Bubble Jet Copia (available from Canon Inc.)

Recording medium B: Ink-jet coated paper, Matt Coat NM (trade name; available from Mitsubishi Paper Mills Co., Ltd.

Recording medium C: Designated paper for Paint Jet (available from Hewlett-Packard Co.)

Evaluation method and evaluation criteria (1) Clogging observed when the printing was stopped for a while and then again started The printing was stopped after alphanumeric characters were continuously printed on the recording medium C for 10 minutes using the printer filled with a given ink, and then the alphanumeric characters were again printed after the nozzles of the printer were left to stand for 10 minutes without capping on the nozzle (which were left to stand at 20°±5° C. under 50±10% RH). Judgement was made on whether defective prints such as blurs and chips of the reprinted characters are seen or not.

A: No defective prints were seen on all the characters.
B: Part of first reprinted character was blurred or chipped.
C: No character to be first reprinted was printed.

(2) Performance of recovery from clogging observed when the printing was stopped for a long term and then again started The printing was stopped after alphanumeric characters were continuously printed on the recording medium C for 10 minutes using the printer filled with a given ink, and the operation for recovery of the clogging of nozzles were carried out after the nozzles of the printer were left to stand for 7 days without capping on the nozzle (which was left to stand at 60° C. under 10±5% RH). Judgement was made on how many times the operation for recovery had to be repeated to enable normal printing free from blurs or chips of the reprinted characters.

A: Normal printing became possible after the recovery operation was repeated once to five times.
B: Normal printing became possible after the recovery operation was repeated six to ten times.
C: Normal printing became possible after the recovery operation was repeated eleven or more times.

(3) Color change resistance

A black solid pattern of 10 mm×30 mm was printed on each of the recording mediums A, B and C. Thereafter, as a color change promotion means, the print was left to stand for 60 minutes in a light-intercepted chamber in which the density of ozone was kept constant within the range of 0.1±0.05% by volume, and the color differences ($\Delta E^*ab$) after and before the test were measured (according to JIS Z8730).

A: $\Delta E^*ab < 5$
B: $5 \leq \Delta E^*ab \leq 10$
C: $10 < \Delta E^*ab < 20$
D: $\Delta E^*ab \geq 20$

TABLE 1

| Evaluation items | Example No. | | | | | | | | |
|---|---|---|---|---|---|---|---|---|---|
| | 1 | 2 | 3 | 4 | 5 | 6 | 7 | 8 | 9 |
| (1) | A | A | A | A | A | A | A | A | A |
| (2) | A | A | A | A | A | A | A | A | A |
| (3) RM (A) | B | A | A | B | A | B | B | A | A |
| RM (B) | B | A | A | B | A | B | B | A | A |
| RM (C) | B | A | A | B | A | B | B | A | A |

TABLE 2

| Evaluation items | Comparative Example No. | | | |
|---|---|---|---|---|
| | 1 | 2 | 3 | 4 |
| (1) | A | A | A | A |
| (2) | A | A | A | A |
| (3) RM (A) | D | D | D | D |
| RM (B) | D | D | D | D |
| RM (C) | D | D | D | D |

Remarks

Evaluation item (1): Clogging after stop of printing for a while
Evaluation item (2): Recovery of clogging after stop of printing for a long term
Evaluation item (3): Color change resistance
RM (A): Recording medium A
RM (B): Recording medium B
RM (C): Recording medium C Further, with respect to each ink in Examples 1 to 9, the ink absorber of the ink-jet device as shown in FIG. 5 was impregnated with the ink. Then the ink jet apparatus as shown in FIG. 3 was allowed to carry the ink-jet device. By use of the ink jet apparatus, recording was performed. As a result, good recording which was excellent in a discharge property could be realized.

As described in the above, the present invention has made it possible to form an image not only having superior performances such as clogging resistance of inks, as generally required, but also having superior color change resistance.

We claim:

1. A method of carrying out recording comprising the step of applying an ink to a recording medium, wherein said ink comprises a dye and a liquid medium, said dye being represented by the following Formula (I):

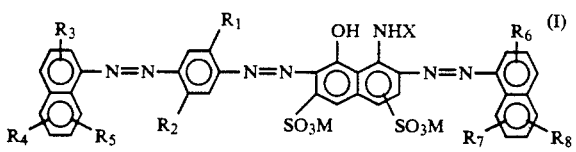

wherein M represents a cation selected from of any of an alkali metal, ammonium, and an organic ammonium; $R_1$ and $R_2$ independently represent a group selected from a hydrogen atom, a methyl group, a methoxy group, an ethoxy group, and an acetylamino group; $R_3$, $R_4$, $R_5$, $R_6$, $R_7$ and $R_8$ independently represent a group selected from a hydrogen atom, a hydroxyl group, a sulfonic acid group, a methoxy group, and an ethoxy group; X represents a hydrogen atom, an acetyl group, a benzolyl group, $-SO_2C_6H_5$, $-SO_2C_6H_4CH_3$, or

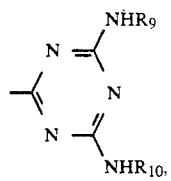

where $R_9$ and $R_{10}$ independently represent a hydrogen atom, or $-C_2H_4OH$; and said sulfonic acid group being present as a salt of the same cation as that represented by M.

2. A method according to claim 1, wherein said recording is carried out in an ink-jet recording system.

3. A method according to claim 2, wherein said ink-jet recording system is a system in which ink droplets are ejected from minute openings by applying heat energy to the ink.

4. A method according to claim 1, wherein said recording medium has, on its surface, an ink-receiving layer comprising a pigment and a binder.

5. A method according to claim 1, wherein said dye is contained in an amount ranging from 0.1 to 15% by weight based on the total weight of the ink.

6. A recording process according to claim 1, wherein said liquid medium comprises a water-soluble organic solvent and water.

7. A method according to claim 6, wherein said water is contained in an amount of at least 35% by weight based on the total weight of the ink.

8. A method according to claim 6, wherein said water-soluble organic solvent is contained in an amount ranging from 2 to 80% by weight based on the total weight of the ink.

9. An ink jet device comprising an ink storing member impregnated with an ink comprising a dye that is contained in an amount ranging from 0.1 to 15% by weight based on the total weight of the ink, and a liquid medium that comprises a water-soluble organic solvent and water, wherein said dye is a dye of Formula (I):

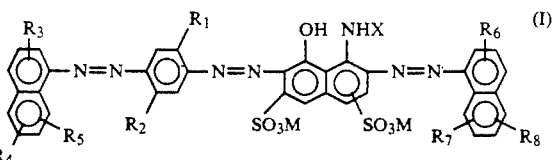

wherein M represents a cation selected from an alkali metal, ammonium, and an organic ammonium; $R_1$ and $R_2$ independently represent a group selected from a hydrogen atom, a methyl group, a methoxy group, an ethoxy group, and an acetylamino group; $R_3$, $R_4$, $R_5$, $R_6$, $R_7$ and $R_8$ independently represent a group selected from a hydrogen atom, a hydroxyl group, a sulfonic acid group, a methoxy group, and an ethoxy group; X represents a hydrogen atom, an acetyl group, a benzolyl group, $-SO_2C_6H_5$, $-SO_2C_6H_4CH_3$, or

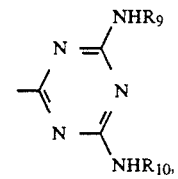

where $R_9$ and $R_{10}$ independently represent a hydrogen atom, or $-C_2H_4OH$; and said sulfonic acid group is present as a salt of the same cation as that represented by M; and a head having a plurality of orifices for discharging said ink as ink droplets.

10. An ink jet device according to claim 9, wherein said ink storing member is an ink absorber or an ink bag.

11. An ink jet device according to claim 9, wherein said head has a heating head to provide to said ink a heat energy for discharging ink droplets.

12. An ink jet device according to claim 9, wherein said water-soluble organic solvent is contained in an amount ranging from 2 to 80% by weight based on the total weight of the ink.

13. An ink jet device according to claim 14, wherein said water is contained in an amount of at least 35% by weight based on the total weight of the ink.

14. An ink jet recording apparatus comprising an ink jet device comprising an ink storing member impregnated with an ink comprising a dye that is contained in an amount ranging from 0.1 to 15% by weight based on the total weight of the ink, and a liquid medium that comprises a water-soluble organic solvent and water, wherein said dye is a dye of Formula (I):

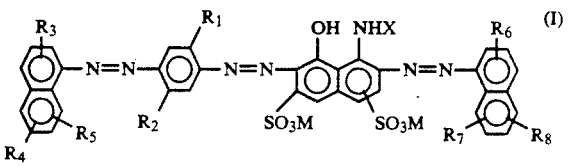

wherein M represents a cation selected from an alkali metal, ammonium, and an organic ammonium; $R_1$ and $R_2$ independently represent a group selected from a hydrogen atom, a methyl group, a methoxy group, an ethoxy group, and an acetylamino group; $R_3$, $R_4$, $R_5$, $R_6$, $R_7$ and $R_8$ independently represent a group selected from a hydrogen atom, a hydroxyl group, a sulfonic acid group, a methoxy group, and an ethoxy group; X represents a hydrogen atom, an acetyl group, a benzolyl group, —$SO_2C_6H_5$, —$SO_2C_6H_4CH_3$, or

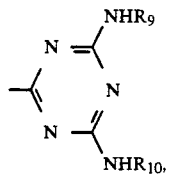

where $R_9$ and $R_{10}$ independently represent a hydrogen atom, or —$C_2H_4OH$; and said sulfonic acid group is present as a salt of the same cation as that represented by M; and a head having a plurality of orifices for discharging said ink as ink droplets.

15. An ink jet recording apparatus according to claim 14, wherein said ink storing member is an ink absorber or an ink bag.

16. An ink jet recording apparatus according to claim 14, wherein said head has a heating head to provide to said ink a heat energy for discharging ink droplets.

17. An ink jet recording apparatus according to claim 14, wherein said water-soluble organic solvent is contained in an amount ranging from 2 to 80% by weight based on the total weight of the ink.

18. An ink jet recording apparatus according to claim 14, wherein said water is contained in an amount of at least 35% by weight based on the total weight of the ink.

19. An ink cartridge comprising an ink bag impregnated with an ink comprising a dye that is contained in an amount ranging from 0.1 to 15% by weight based on the total weight of the ink, and a liquid medium that comprises a water-soluble organic solvent and water, wherein said dye is a dye of Formula (I):

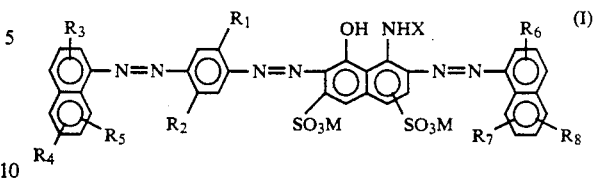

wherein M represents a cation selected from an alkali metal, ammonium, and an organic ammonium; $R_1$ and $R_2$ independently represent a group selected from a hydrogen atom, a methyl group, a methoxy group, an ethoxy group, and an acetylamino group; $R_3$, $R_4$, $R_5$, $R_6$, $R_7$ and $R_8$ independently represent a group selected from a hydrogen atom, a hydroxyl group, a sulfonic acid group, a methoxy group, and an ethoxy group; X represents a hydrogen atom, an acetyl group, a benzolyl group, —$SO_2C_6H_5$, —$SO_2C_6H_4CH_3$, or

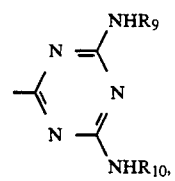

where $R_9$ and $R_{10}$ independently represent a hydrogen atom, or —$C_2H_4OH$; and said sulfonic acid group is present as a salt of the same cation as that represented by M.

20. The ink cartridge according to claim 19, wherein said water-soluble organic solvent is contained in an amount ranging from 2 to 80% by weight based on the total weight of the ink.

21. The ink cartridge according to claim 19, wherein said water is contained in an amount of at least 35% by weight based on the total weight of the ink.

* * * * *

UNITED STATES PATENT AND TRADEMARK OFFICE
CERTIFICATE OF CORRECTION

PATENT NO. : 5,216,437  Page 1 of 2
DATED : June 1, 1993
INVENTOR(S) : Yamamoto et al.

It is certified that error appears in the above-indentified patent and that said Letters Patent is hereby corrected as shown below:

On title page, item
[30] Foreign Application Priority Data:

"Jan. 1, 1990 [JP] Japan ..... 2-938" should read
--Jan. 9, 1990 [JP] Japan ..... 2-938--.

COLUMN 1:

Line 20, "as inks used" should read --used as inks--;
Line 57, "an" should read --a--;
Line 64, "black 2" should read --Black 2--; and
Line 66, "comprises" should read --comprise--.

COLUMN 11:

Line 57, "tertbutyl" should read --tert-butyl--.

COLUMN 12:

Line 10, "view point" should read --viewpoint--; and
Line 23, "many" should read --may--.

COLUMN 13:

Line 9, "wood free" should read --wood-free--; and
Line 14, "wood free" should read --wood-free--.

UNITED STATES PATENT AND TRADEMARK OFFICE
CERTIFICATE OF CORRECTION

PATENT NO. : 5,216,437
DATED : June 1, 1993
INVENTOR(S) : Yamamoto et al.

It is certified that error appears in the above-indentified patent and that said Letters Patent is hereby corrected as shown below:

COLUMN 14:

Line 16, "off" should read --of--.

COLUMN 17:

Line 44, "Copia" should read --Copier--; and
Line 47, "Ltd." should read --Ltd.)--.

COLUMN 19:

Line 21, "from of" should read --from--; and
Line 56, "recording process" should read --method--.

COLUMN 20:

Line 47, "claim 14," should read --claim 9,--.

Signed and Sealed this

Twenty-second Day of March, 1994

Attest:

BRUCE LEHMAN

Attesting Officer    Commissioner of Patents and Trademarks